Jan. 3, 1950  J. N. GONZALEZ  2,493,668
EDUCATIONAL APPARATUS
Filed July 1, 1946  2 Sheets-Sheet 1
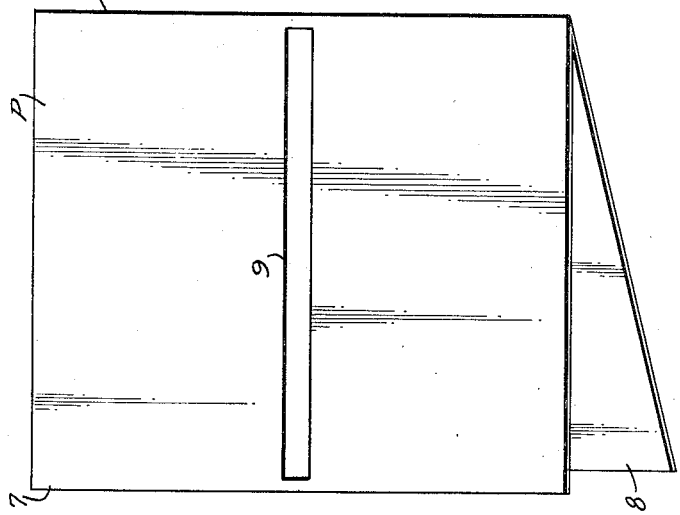

Figures 3, 5:
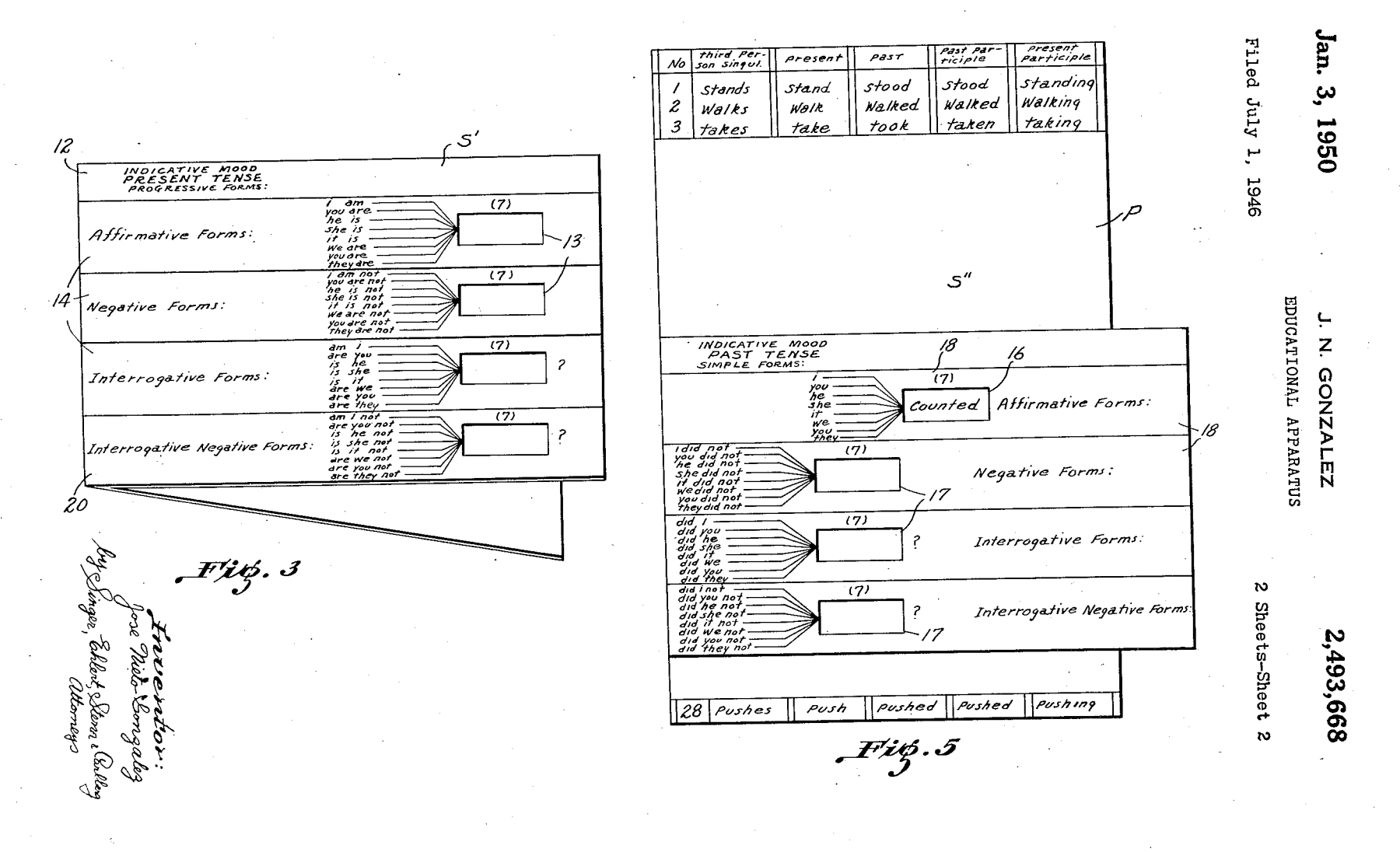

Jan. 3, 1950     J. N. GONZALEZ     2,493,668
EDUCATIONAL APPARATUS

Filed July 1, 1946     2 Sheets-Sheet 2

Inventor:
Jose Nieto Gonzalez
by Singer, Ehlert, Stern & Carlberg
Attorneys

Patented Jan. 3, 1950

2,493,668

UNITED STATES PATENT OFFICE 2,493,668

EDUCATIONAL APPARATUS

Jose Nieto Gonzalez, Salamanca, Gto., Mexico

Application July 1, 1946, Serial No. 680,770

3 Claims. (Cl. 35—35)

This invention relates to improvements in educational apparatus.

It is an object of the invention to facilitate the selection of the correct datum out of a great number of data by arranging the data in a plurality of groups and providing means for visually separating a group out of this plurality, and the correct datum out of the visually separated group.

In its application to the study of languages, the invention has the object of arranging words of similar syntactic or grammatical character, as for instance, verbs, in a plurality of groups, each group showing the same verb in different tenses or forms, and to provide means for primarily selecting for any verb all of the different forms which are in the same groups, and secondarily singling out from the selected group that form only which it is to use. In this manner the conjugation of verbs may be said to be mechanized and the study of languages facilitated.

With these and other objects in view, an embodiment of the invention as applied to the study of the English language, is illustrated in the accompanying drawing and is referred to in the following specification:

Fig. 1 is a face view of a sheet showing a plurality of groups of verbs in different tenses or forms thereon;

Fig. 2 shows in front elevation, a selector sheet to facilitate the selection of any one of the group of verbs;

Fig. 3 is a front elevation of a second selector sheet;

Fig. 4 shows the application of a first selector sheet to the base sheet illustrated in Fig. 1, and Fig. 5 shows the application of both selector sheets to the base sheet of Fig. 1.

By reference to Fig. 1, it will be seen that the invention is illustrated in its association with the study of verbs of the English language. A number of different verbs are consecutively numbered in column 1 of the base sheet B. In the example illustrated, the various verbs are by way of illustration printed in column 2 in the form of their "third person singular, present tense." Another column 3 contains the same verbs in the same sequence in the form of the "present indicative," first person or infinitive. Column 4 contains the same verbs in the same sequence in their form of the past tense. The next column 5 contains the same verbs in the same sequence in the form of their past participle, and the last column 6 lists the same verbs in the same sequence in their form of the present participle. The base sheet B, therefore, contains a plurality of horizontal groups, each of the same verb, but the same verb being shown in different forms, and the base sheet also may be described as containing groups of different verbs in vertical alinement. The horizontal groups or rows each pertain to the same verb in different forms, while the vertical columns or groups pertain to the same form of different verbs.

The primary cover sheet or selector P is shown as comprising two flaps 7 and 8 of approximately the width as the base sheet B, and adapted to cover the greater number of the plurality of groups of data on the base sheet when properly applied to the same. This primary selector sheet P has in the front flap 7 or in both flaps a horizontal opening indicated at 9 of a width large enough to permit inspection of an entire horizontal group of data printed on the base sheet while obstructing the data in the other horizontal and vertical groups above and below that group which is rendered visible through the window 9. This primary selector sheet P may, for instance, be applied in such manner that the fold 10 of the selector sheet engages the right hand edge 11 of the base sheet. This application is illustrated in Fig. 4 in which it is shown that the selector sheet is applied to single out of the plurality of horizontal groups or rows of data contained on the base sheet, the row containing the various forms of the verb "to count."

Even if this primary selector should not cover the entire printed face of the base sheet B, the appearance of data above or below the horizontal edges of the selector sheet P will not be disturbing, since through the provision of the horizontal window 9, the selected group is sufficiently set off from the remainder of the plurality of groups on the base sheet.

A secondary selector sheet S' is shown in Fig. 3, where it is illustrated as providing near its top edge an indication 12 showing for which selection of forms this secondary selector S' may be used. This secondary selector sheet is provided with a plurality of cut-outs 13, which upon proper application of the selector sheet to the base sheet will be in register in the embodiment illustrated with the vertical group 6 of the groups printed on the base sheet 1. Each cut-out 13 is located in a field 14 which is provided with data explaining the application of this form and containing additionally the auxiliary verbs where required for making use of the form displayed through the window 7 in the proper conjugation of the selected form.

Thus, it will be seen that for instance in the example illustrated, the secondary selector sheet S' is arranged to permit the selection of the verbs in the form of their "present participle," and the various fields 14 on the selector sheet show imprints of the affirmative forms, negative forms, etc., together with the proper auxiliary verbs employed in association with phrases making use of the present participle.

A different selector sheet S'' is illustrated in Fig. 5 as being applied to the same base sheet. The selector sheet S'' bears near the top a field 15 with an indication showing that it is intended to be used for the past tense, and hence, that it would primarily be of value with the group of verbs indicated at 4 in Fig. 1. But, owing to the peculiarities of the English language, the form of the verb in negative or interrogative phrases calls for the use of the present tense form of the verb, and it will be seen, therefore, that the cut-outs 16 and 17 in the various fields 18 of the selector S'' are not in alinement with each other.

The secondary selector S' or S'' is applied with its folded edge 20 to engage the left hand edge 19 of the base sheet and to overlie the primary selector P which is brought into overlying relation with respect to the base sheet from the right hand edge.

In the use of the device, the student who desires to find the proper form for a certain verb out of the group of verbs and out of the groups of different forms will first apply the primary selector to set off the selected verb, as indicated in Fig. 4. He will then apply from the opposite edge the required secondary selector S' or S'', depending as to whether he desires a form in the present or past tense of the respective verb.

Fig. 5 illustrates that the secondary selector S'' for indicating the past tense forms of the verbs is applied in such manner as to permit the student to see the proper past affirmative form of the verb "counted," since the primary selector sheet P had been previously applied to display all of the forms of the same verb.

If the student would have desired to find out the proper form of the verb "count" for the past tense in a negative phrase, the selector sheet S'' would have to be shifted upwardly to bring the field for the negative forms in register with the row of forms of the selected verb.

I claim:

1. In an apparatus of the character described, the combination of a base sheet on which a plurality of verbs are arranged in vertical columns and different forms of said verbs are arranged in horizontal rows pertaining to said columns, a first selector sheet having a horizontal cut-out extending over the width of the selector sheet and applicable to the base sheet to selectively cover the data with the exception of the data in one horizontal row displayed through said horizontal cut-out, and a second selector sheet having a cut-out in alinement with a vertical column of the base sheet and applicable to the combination of the base sheet and first selector sheet and adapted to cover the forms of the selected row, with the exception of the form displayed through said cut-out.

2. In an apparatus of the character described, the combination of a base sheet on which are imprinted in vertical columns different verbs and on which are imprinted different forms of the same verbs in horizontal rows, the forms of different verbs pertaining to the same tense being alined each in a vertical column, a first selector sheet applicable to the base sheet and being provided with a horizontal cut-out portion through which, depending upon the selected application of the selector sheet to the base sheet, an entire horizontal row of various forms of a verb is visible, and a second selector sheet provided with openings and applicable over the first selector sheet to bring any selected opening into register with the cut-out of the first selector sheet, the openings of the second selector sheet being arranged in columns, whereby the selection of a certain form of a selected verb is made possible.

3. In an apparatus of the character described, the combination of a base sheet carrying a plurality of verbs in one column and a plurality of different forms of the same verbs in horizontal rows intersecting the column of the verbs, the forms of the different rows also being arranged in vertical columns on said sheet, a first selector sheet laterally applicable to the base sheet and being provided with a cut-out through which upon application to the base sheet a horizontal row of different forms of the same verb is visible through said cut-out, said selector sheet being displaceable vertically relatively to the base sheet, whereby through the cut-out different rows of forms pertaining to different verbs are rendered visible while the other forms are covered by said selector sheet, a plurality of second selector sheets, each carrying indications relating to the tense to which said second selector sheet pertains, said second selector sheet having cut-outs arranged in columns and being movable vertically relatively to the first named selector sheet, whereby upon vertical displacement of said second selector sheet relatively to said first sheet, a form of the verbs in a selected row of forms is rendered visible.

JOSE NIETO GONZALEZ.

REFERENCES CITED

The following references are of record in the file of this patent:

UNITED STATES PATENTS

| Number | Name | Date |
|--------|------|------|
| 840,144 | Lincoln | Jan. 1, 1907 |